Aug. 30, 1932.  F. W. SAMPSON  1,874,363
BRAKE
Filed Dec. 6, 1928
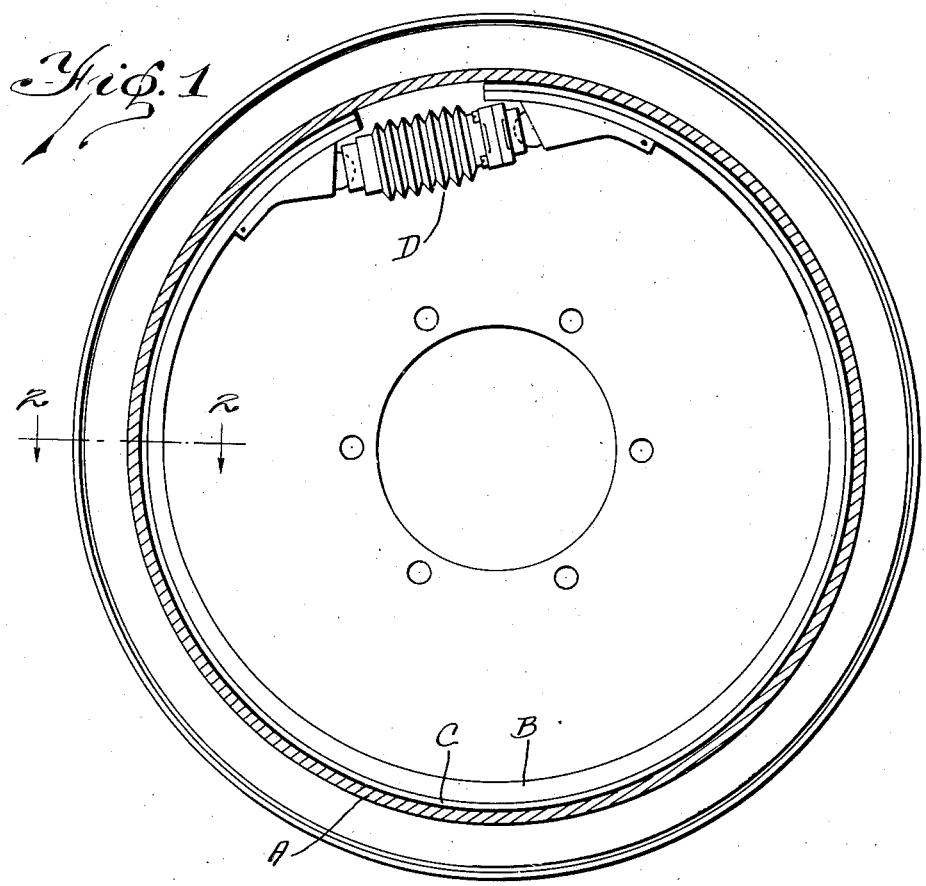
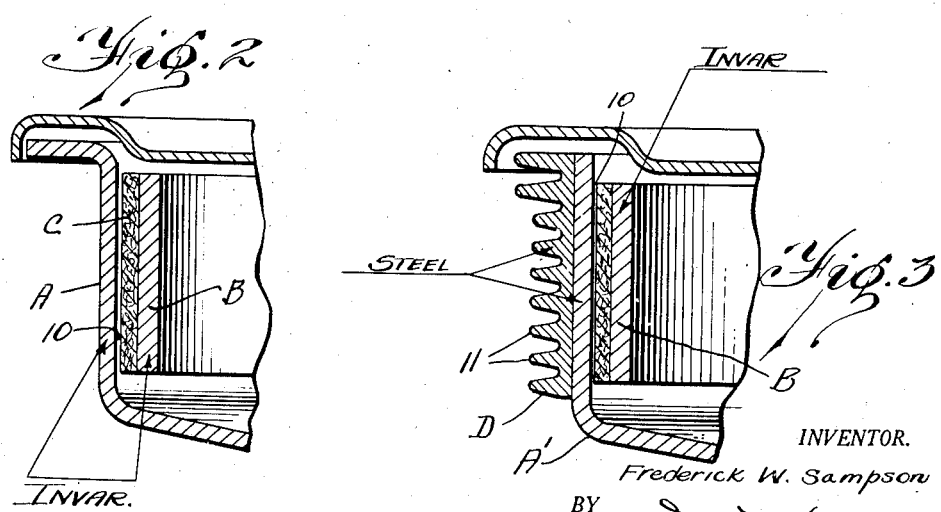
INVENTOR.
Frederick W. Sampson
BY
ATTORNEY.

Patented Aug. 30, 1932

1,874,363

UNITED STATES PATENT OFFICE

FREDERICK W. SAMPSON, OF DETROIT, MICHIGAN, ASSIGNOR TO CONTINENTAL MOTORS CORPORATION, OF DETROIT, MICHIGAN, A CORPORATION OF VIRGINIA

BRAKE

Application filed December 6, 1928. Serial No. 324,240.

This invention relates to brakes, especially adapted to be used in connection with motor vehicles. It is an object of the invention to provide a brake which will operate efficiently under all conditions of vehicle operations.

Heretofore, particularly in larger size brakes for checking movement of relatively heavy vehicles, the heat developed by the brake parts resulted in materially lessening the brake efficiency sometimes to such an extent that the brake will seize or else present practically negligible braking effort. These conditions vary with different styles of brakes where one or more brake bands or shoes are arranged either externally or internally of the brake drum. The teachings of my invention are applicable to all types of brakes and by way of example I have illustrated my invention in connection with an internal vehicle brake, this being the common way of referring to brakes having their friction bands arranged internally of the drums.

I have found that in the internal types of brake, particularly under severe usage or in warm weather the brake band in some instances tends to lag behind the drum with respect to cooling after brake actuation, resulting in a tendency for the brake to seize. Under such circumstances the brake clearance between band and drum when in the released position partially or wholly disappears under the excessive expansion of the brake shoe. Under other conditions the brake drum expands excessively resulting in excess clearance and brake slippage. In the external type of brake similar objections are met with since unequal expansions of the band or shoe and the drum will result in varying degrees of tendencies toward brake seizure or slippage.

I have provided a novel brake structure which will not be influenced by the generated heat, whereby the brake will operate efficiently under all conditions of service.

Further objects and advantages of my invention reside in the novel combinations and details of construction more particularly set forth in the following description and claims.

Referring to the accompanying drawing,

Fig. 1 is an elevation view showing an internal brake embodying my invention,

Fig. 2 is a detail sectional view along 2—2 of Fig 1, and

Fig. 3 is a view corresponding to Fig. 2 illustrating a modification.

Referring to the drawing, reference character A designates the brake drum and B the shoe of the internal expanding type carrying the friction band or lining C engageable with the drum interior. The shoe B illustrated is of the one-piece eccentric type expanded by suitable mechanism illustrated in part at D. By the term "eccentric" I mean a shoe which decreases in thickness toward its ends such as illustrated in Fig. 1. It should be understood that the particular brake actuating devices and arrangements in themselves may take any desired form. In order to control the expansion of the drum A and/or shoe B I construct such parts from a suitable metal or alloy having a relatively small coefficient of expansion. Thus I have discovered that by constructing such parts of commercial invar the resulting brake operation will be substantially equally efficient under all conditions of heat dissipation. In Fig. 2 the drum A and shoe B are illustrated as both constructed of invar although in some instances the desired objects may be obtained by controlling the expansion of only one of these elements through the use of the invar. With my invention the desired braking efficiency is unaltered by severe usage of the brakes, the desired clearance 10 remaining substantially constant.

In Fig. 3 the band B is constructed of invar as before, in order to substantially prevent its diametrical expansion under the influence of generated heat. The steel drum A' is provided with air cooling fins 11 preferably in the form of a steel band D shrunk on the drum exterior. If desired the fins 11 may be integrally formed with the drum but by the provision of band D I am enabled to simplify and cheapen the drum from the manufacturing standpoint.

While I have referred to invar as used to control the expansion of the brake parts I desire it understood that other alloys and materials of the desired characteristics may be used as desired. I have referred to invar since it is readily obtainable on the market and since my experiments have shown that it is well adapted in fulfilling the objects of my invention.

What I claim as my invention is:

1. In a brake, metallic brake drum means, metallic brake shoe means adapted to be moved into friction engagement with said brake drum means, one of said means being constructed of a material having a relatively small coefficient of expansion whereby to maintain the desired clearance between the brake drum means and brake shoe means upon release of the brake after braking operation.

2. In a brake, brake drum means, brake shoe means adapted to be moved into friction engagement with said brake drum means, one of said means being constructed of invar whereby to maintain the desired clearance between the brake drum means and brake shoe means upon release of the brake after braking operation.

3. In a brake, a drum, brake shoe means frictionally engageable with the drum, said drum and shoe means being constructed of materials having the characteristic of maintaining substantially constant diameter under the influence of the heat generated by the braking action.

4. In a brake, a drum, brake shoe means frictionally engageable with the drum, said drum and shoe means being constructed of invar.

5. In a brake, a drum, a shoe provided with friction material interiorly engageable with the drum there being a clearance space between the drum and friction material when the brake is inactive, said shoe being constructed of a material having a relatively small coefficient of expansion whereby the said clearance space is maintained upon release of the brake after braking operation.

6. In a brake, a drum, a shoe provided with friction material interiorly engageable with the drum there being a clearance space between the drum and friction material when the brake is inactive, said shoe and drum being constructed of a material having a relatively small coefficient of expansion whereby the said clearance space is maintained upon release of the brake after braking operation.

7. In a brake, a drum, an eccentric shoe provided with friction material interiorly engageable with the drum there being a clearance space between the drum and friction material when the brake is inactive, said shoe being constructed of a material having a relatively small coefficient of expansion whereby the said clearance space is maintained upon release of the brake after braking operation.

8. A brake comprising in combination, a drum, a shoe provided with friction material interiorly engageable with the drum there being a clearance space between the drum and friction material when the brake is inactive, said shoe being constructed of a material of relatively small coefficient of expansion, said drum provided with cooling means cooperating with the shoe to substantially maintain said clearance when the brake is released from braking operation.

9. A brake comprising in combination, a drum, a shoe provided with friction material interiorly engageable with the drum there being a clearance space between the drum and friction material when the brake is inactive, said shoe being constructed of a material of relatively small coefficient of expansion, said drum provided with cooling means, said shoe material and cooling means respectively controlling outward expansion of the friction material and drum under the influence of heat generated by the brake so as to substantially maintain said clearance when the brake is released from braking operation.

10. A brake comprising in combination, a drum, a shoe provided with friction material interiorly engageable with the drum there being a clearance space between the drum and friction material when the brake is inactive, said shoe being constructed of a material of relatively small coefficient of expansion, said drum provided with cooling means, said shoe material and cooling means respectively controlling outward expansion of the friction material and drum under the influence of heat generated by the brake so as to substantially maintain said clearance when the brake is released from braking operation, said cooling means comprising a ribbed band encircling said drum.

11. An invar brake band.

In witness whereof, I hereunto subscribe my name this 24th day of November, A. D. 1928.

FREDERICK W. SAMPSON.